(12) United States Patent
Islam

(10) Patent No.: US 8,977,788 B2
(45) Date of Patent: Mar. 10, 2015

(54) OBSERVING AN INTERNAL LINK VIA AN EXISTING PORT FOR SYSTEM ON CHIP DEVICES

(75) Inventor: Syed Z. Islam, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1151 days.

(21) Appl. No.: 12/890,647

(22) Filed: Sep. 25, 2010

(65) Prior Publication Data

US 2011/0078483 A1 Mar. 31, 2011

Related U.S. Application Data

(63) Continuation-in-part of application No. 12/228,493, filed on Aug. 13, 2008, now Pat. No. 7,958,283.

(51) Int. Cl.
| | |
|---|---|
| *G06F 3/00* | (2006.01) |
| *G01R 31/28* | (2006.01) |
| *G06F 11/27* | (2006.01) |
| *G06F 11/22* | (2006.01) |

(52) U.S. Cl.
CPC ............ *G06F 11/27* (2013.01); *G06F 11/2236* (2013.01)
USPC .............................. 710/51; 710/305; 714/724

(58) Field of Classification Search
CPC .......... G06F 13/00; G06F 13/14; G01R 31/28
USPC ................... 710/33, 51, 52, 60, 61, 110, 305; 714/724, 731, 733, 734, 744
See application file for complete search history.

(56) References Cited

U.S. PATENT DOCUMENTS

| | | | |
|---|---|---|---|
| 5,568,492 A | 10/1996 | Flint et al. | |
| 5,613,144 A | 3/1997 | Hall et al. | |
| 5,796,746 A | 8/1998 | Farnworth et al. | |
| 6,009,488 A | 12/1999 | Kavipurapu | |
| 6,385,236 B1 | 5/2002 | Chen | |
| 6,825,683 B1 | 11/2004 | Berndt et al. | |
| 6,826,100 B2 * | 11/2004 | Ellis et al. ...................... | 365/201 |
| 6,964,004 B2 * | 11/2005 | Chatterjee et al. ............. | 714/732 |
| 6,975,954 B2 | 12/2005 | Mak et al. | |
| 7,139,957 B2 * | 11/2006 | Querbach et al. .............. | 714/745 |
| 7,375,550 B1 * | 5/2008 | Redgrave et al. ................ | 326/38 |
| 7,437,643 B2 * | 10/2008 | Khanna et al. ................. | 714/733 |
| 7,500,164 B2 * | 3/2009 | Chelstrom et al. ............. | 714/729 |

(Continued)

FOREIGN PATENT DOCUMENTS

| | | |
|---|---|---|
| EP | 1 580 810 A2 | 9/2005 |
| WO | 2005/069025 A1 | 7/2005 |
| WO | 2006/061668 A1 | 6/2006 |

OTHER PUBLICATIONS

Office Action received for U.S. Appl. No. 12/228,493, mailed on Oct. 14, 2010, 11 pages.

(Continued)

*Primary Examiner* — Khanh Dang
(74) *Attorney, Agent, or Firm* — Alpine Technology Law Group LLC

(57) ABSTRACT

Methods and apparatus relating to observing an internal link via an existing port for System On Chip (SOC) devices are described. In one embodiment, a logic within an SOC device may allow an external logic analyzer to observe communication between a first and second component of the SOC through an existing (e.g., shared and/or non-dedicated) interface. Other embodiments are also disclosed.

20 Claims, 6 Drawing Sheets

(56) References Cited

U.S. PATENT DOCUMENTS

| | | | |
|---|---|---|---|
| 7,525,723 B2 | 4/2009 | Dabral et al. | |
| 7,633,877 B2 * | 12/2009 | Sharma et al. | 370/241 |
| 7,958,283 B2 | 6/2011 | Islam et al. | |
| 2002/0019962 A1 * | 2/2002 | Roberts et al. | 714/724 |
| 2004/0117709 A1 * | 6/2004 | Nejedlo et al. | 714/738 |
| 2006/0224815 A1 | 10/2006 | Yamada et al. | |
| 2007/0226482 A1 * | 9/2007 | Borkar et al. | 713/100 |
| 2007/0237527 A1 * | 10/2007 | Dabral et al. | 398/183 |
| 2007/0261033 A1 * | 11/2007 | Chen et al. | 717/130 |
| 2008/0005537 A1 | 1/2008 | Apparao et al. | |
| 2008/0005621 A1 | 1/2008 | Bedwani et al. | |
| 2008/0074992 A1 * | 3/2008 | Sams et al. | 370/216 |
| 2008/0122463 A1 | 5/2008 | Dabral et al. | |
| 2008/0163034 A1 * | 7/2008 | Tate et al. | 714/799 |
| 2009/0172243 A1 | 7/2009 | Champagne et al. | |
| 2010/0042761 A1 | 2/2010 | Islam et al. | |
| 2010/0313092 A1 * | 12/2010 | Xu et al. | 714/738 |
| 2011/0029830 A1 * | 2/2011 | Miller et al. | 714/734 |

OTHER PUBLICATIONS

Notice of Allowance received for U.S. Appl. No. 12/228,493, mailed on Feb. 14, 2011, 5 pages.

Office Action received for Chinese Patent Application No. 200910165766.4, mailed on Oct. 8, 2010, 3 pages of English Translation and 3 pages of Chinese Office Action.

Combined Search Report and Office Action for United Kingdom Patent Application No. GB0913869.4, mailed on Dec. 21, 2009, 7 pages.

\* cited by examiner

OBSERVING AN INTERNAL LINK VIA AN EXISTING PORT FOR SYSTEM ON CHIP DEVICES

RELATED APPLICATIONS

The present application is a continuation-in-part of and claims priority from U.S. patent application Ser. No. 12/228,493, entitled "Observing an Internal Link Via a Second Link", filed Aug. 13, 2008 now U.S. Pat. No. 7,958,283, published as United States Patent Application 20100042761, which is incorporated herein by reference for all purposes.

FIELD

The present disclosure generally relates to the field of electronics. More particularly, an embodiment of the invention relates to observing an internal link via an existing port for System On Chip (SOC) devices.

BACKGROUND

Generally, a System On Chip (SOC) is manufactured by integrating a set of system components onto a single chip. These system components may communicate with each other by utilizing available interconnects and buses. The interfaces between the system components would typically be externally visible (i.e., outside the SOC) if the system components were packaged individually. However, as these interfaces are not coupled externally in an SOC, the visibility of the interfaces is lost at the SOC level.

One solution is to provide dedicated pins on the SOC package to enable observability of these interfaces to the external world, e.g., for post-silicon debug. Considering the differential nature of these interfaces, sometimes 50-100 dedicated pins are needed on the package to obtain complete visibility. Another option is to provide bumps on the top of the package to enable interconnection with the internal link(s) via probes. The former solution, however, may increase the complexity of routing of interconnection pins, while the latter solution may mandate the need for additional layers of the die. Either option increases the amount of connections and package real estate, and thus raises costs.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments discussed herein allow a debugger or logic analyzer to monitor one or more internal buses (such as serial buses) in a SOC, without using additional external pins or topside probes. This in turn will save costs and complexity. As used herein, the term "bus" and "interconnect" may be interchangeable. Moreover, some external interfaces could run at higher speeds than the internal interface (sometimes at integer multiples of the internal interface speeds). In one embodiment, a hardware implementation is provided which may be integrated in a silicon (Si) component, such as on the Integrated Circuit (IC) device including the SOC, to deliver visibility of internal buses (e.g., using an existing higher speed external interface such as PCIe (e.g., a Peripheral Component Interconnect Express™ interconnect in accordance with the PCI Express™ Specification Base Specification version 2.0 (published Jan. 17, 2007)), QPI (Quick Path Interconnect), etc.). This approach will potentially eliminate the need for 50-100 dedicated bumps or pins on the package for post-Si observability and/or debug. For instance, lower width/speed internal buses may be mapped to higher speed and externally visible buses in some embodiments. This in turn eliminates or reduces the need for dedicated pins by utilizing the higher speed external interface.

Figure 1:
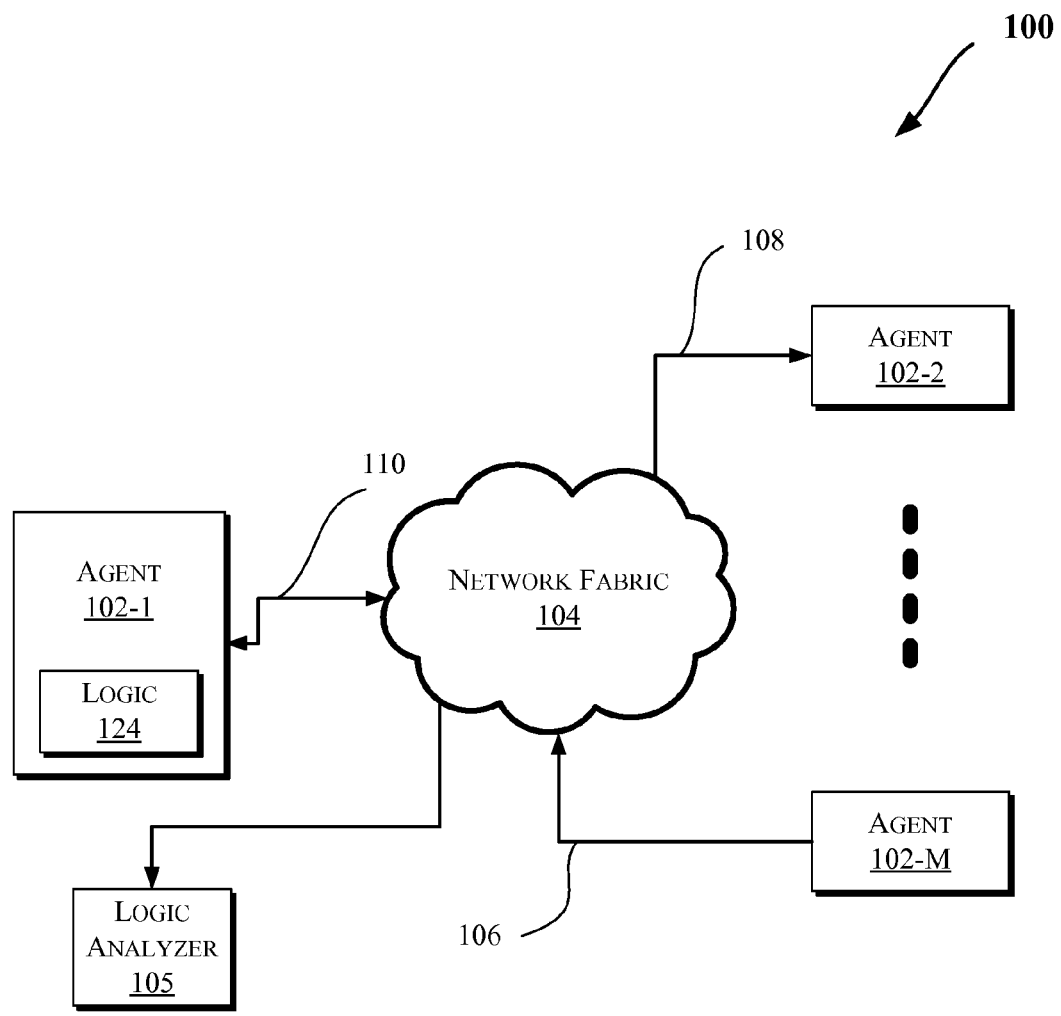
FIGS. 1 and 4-5 illustrate block diagrams of embodiments of computing systems, which may be utilized to implement various embodiments discussed herein.

Various computing systems may be used to implement embodiments, discussed herein, such as the systems discussed with reference to FIGS. 1 and 4-5. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In some embodiments, at least one of the agents (or a plurality of agents) may be implemented as a SOC device, e.g., integrating any number of system components onto a single chip (such as components of the computing systems discussed with reference to FIGS. 4 an/or 5).

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers, e.g., logic analyzer 105). Although logic analyzer 105 is shown to communicate with agents 102 via a network fabric (which may be existing without introduction of any new pins, probes, etc.), an embodiment may utilize a dedicated interface between the logic analyzer 105 and agent 102-1 in addition to the network fabric 104 or instead of the network fabric 104.

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Additionally, at least one of the agents 102 (e.g., agent 102-1 shown) may include a logic 124 to facilitate communication between interconnects/buses within the agent 102-1 and the external devices (such as the logic analyzer 105) via an existing port as will be further discussed with reference to FIG. 2, for example.

Figure 2:
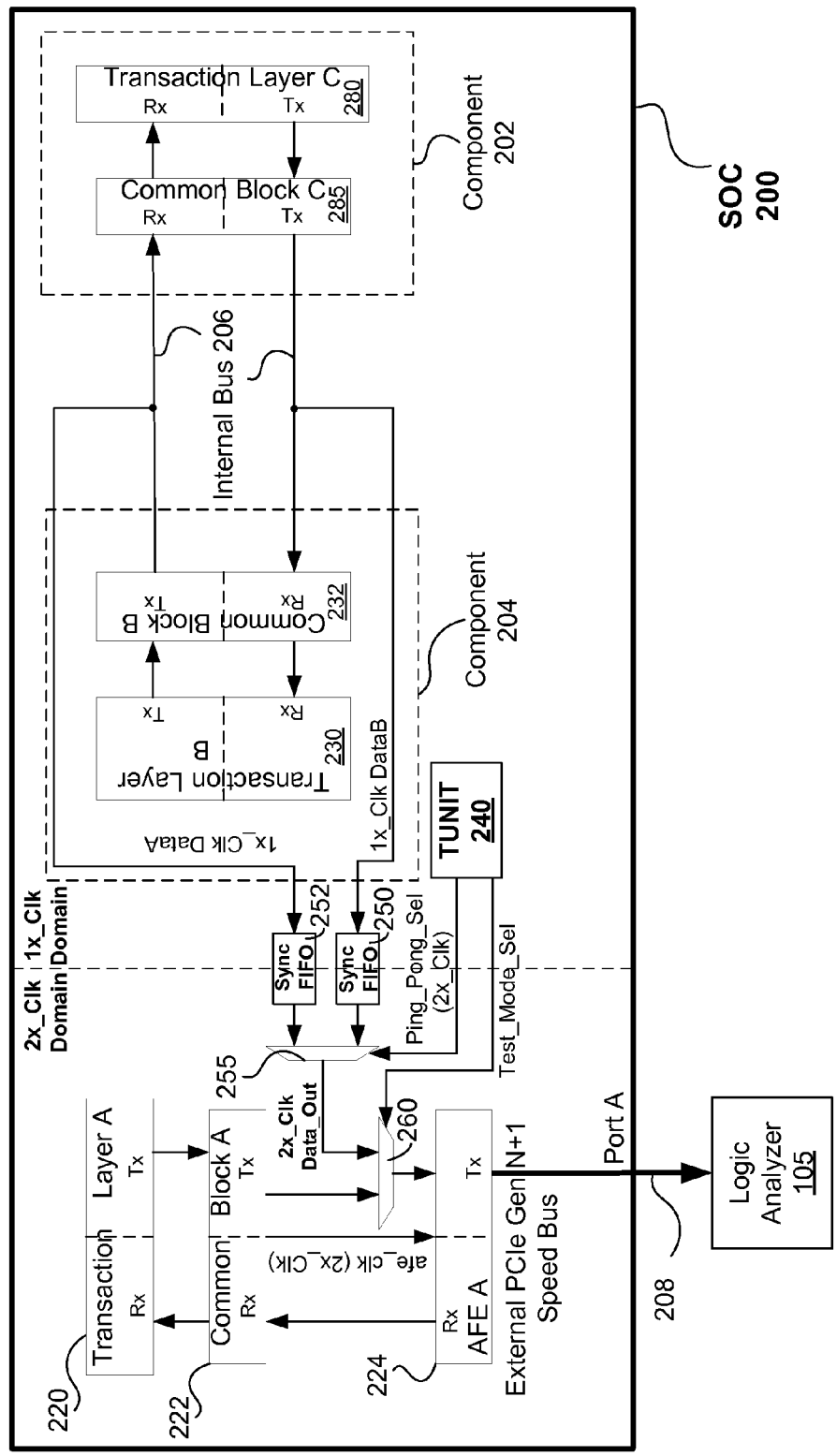
FIG. 2 illustrates a block diagram of a SOC device in accordance with an embodiment of the invention.

FIG. 2 is a block diagram of a SOC device 200 in accordance with an embodiment of the invention. As shown, SOC 200 includes any number of components (such as one or more components of the computing systems discussed with reference to FIGS. 4 an/or 5), two of which are shown 202, 204. Each component may include various logic (not shown to maintain clarity of the discussion regarding observability of internal buses of SOC 200 to the logic analyzer 105) which are to perform one or more operations (such as discussed with reference to FIGS. 1, 4, and/or 5). The two components may be coupled via an internal link 206. While the embodiments of the invention are not limited in this regard, in one embodiment internal link 206 may be a PCIe™ link. For example, the PCI link may be of an N generation and which may have a corresponding link speed of 1x that in one embodiment may be 2.5 gigabits per second (Gbps). In contrast, off-chip communications via a second link 208 (coupled to port A of SOC), which in one embodiment may be a PCIe™ link of a later generation, e.g., N+1, may have a speed of 2x. Port A may include one or more pins and/or probe connectors which facilitate communication between SOC 200 and logic analyzer 105 via the ink 208.

As will be discussed with reference to FIGS. 4 and 5, in various embodiments, one or both of components 202 and 204 may be processors, controllers, memory interfaces, chipsets, or so forth. In one embodiment, component 204 may be a multi-core processor including multiple processors, cache memories, a graphics engine, input/output (I/O) interfaces and so forth. In the same embodiment, component 202 may be a chipset including interface functionality to enable communication with a system memory, a display, and one or more other peripheral devices.

In addition, SOC 200 (e.g., in component 204) may include multiple interfaces or protocol stacks, one of which may enable communication off-package and a second of which may enable intra-package communication. For example, a first interface may include a transaction layer 220, a common block 222 and an analog front end (AFE) 224. This interface may operate at the 2x clock speed. As shown, each of these layers or units includes a receive (RX) portion and a transmit (TX) portion. Transaction layer 220 may, in the transmit direction, receive data to be transmitted from component 204 and generate one or more transaction layer packets (TLPs) which include the data, along with various header and other information dictated by a given protocol. In turn, common block 222 receives this data and appends other information to provide for reliability of transmission, such as various link protocol information including, for example, error correction information, parity information, routing information, etc. Finally, AFE 224 operates to take the digital information and prepare the packets for physical transmission via link 208.

In one embodiment, AFE 224 may include transmitter circuitry such as drivers or so forth to receive the link packets from common block 222 and transmit serial bits, e.g., on a given number of lanes of the interconnect. In one embodiment, AFE 224 may condition the data for transmission via link 208, such as converting the data into differential signals, including for example low voltage differential signals (LVDS) for transmission.

In the receive direction, AFE 224 may receive incoming signals and convert the differential signals to link packets for transmission to common block 222. Further, AFE 224 may include in the receive direction a so-called clock and data recovery (CDR) circuit to further recover a clock transmitted with the data. In the receive direction, common block 222 may perform various processing operations on the data and pass TLPs to transaction layer 220, which may extract the received data and pass it on to further circuitry within component 204.

To enable communication between component 204 and component 202, a second protocol stack or interface is also present including a transaction layer 230 and a common block 232 (without the need for any more AFEs), and may operate similarly to that described above for the first interface. However, in certain embodiments this interface may operate at the 1x clock speed. Again, these layers or blocks of the interface are separated into transmit and receive portions.

To enable post-silicon debug or other testing operations, data along internal link 206 may be provided outside of SOC 200 via second link 208. Thus, data from both the receive and transmit paths of the internal interface (with regard to component 204) may be provided to a multiplexer 255. Note that transmit data (from component 204) may be coupled to multiplexer 255 through a synchronization buffer 252 (which may be implemented as a first in, first out (FIFO) buffer) to cross from a 1x clock domain to a 2x clock domain, while receive data (i.e., from component 202) may be coupled through another synchronization buffer 250 (rather than an elastic buffer) and then to multiplexer 255.

Noting the clock crossing between the two clock domains, namely a 1x clock domain and a 2x clock domain, is shown in FIG. 1 with a dashed line, the external interface coupled to external link 208 may operate at the 2x clock domain, while the internal interface including transaction layer 230 and common block 232 may operate at the 1x clock domain. Thus, data written into synchronization buffers 250 and 252 is according to the 1x clock domain, while data read may be using the 2x clock domain. The purpose of synchronization FIFOs 250-252 is to eliminate or at least reduce any potential glitches in data while crossing 1x to 2x clock domains.

Figure 3A:
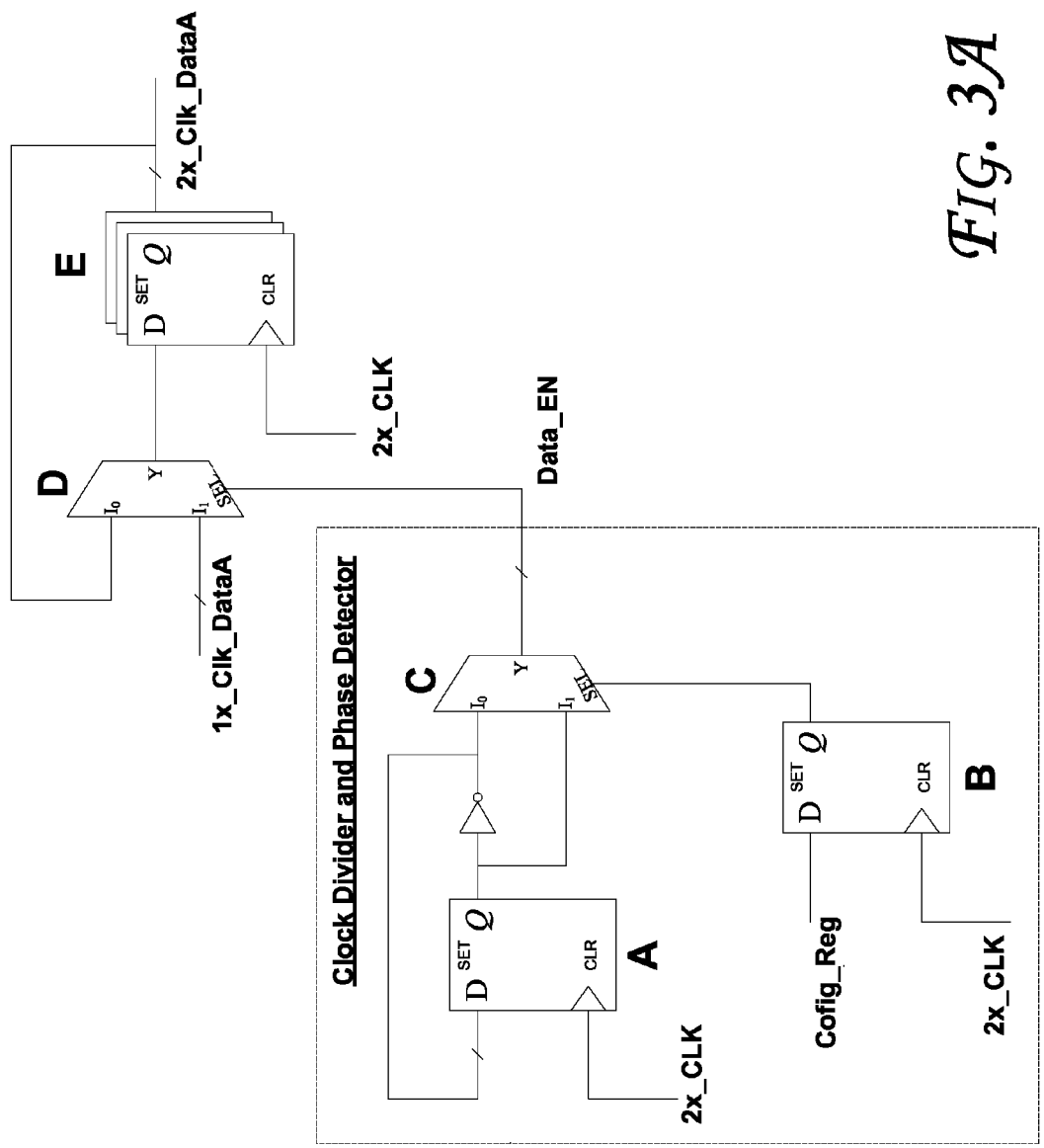
FIG. 3A shows a block diagram of a synchronization FIFO in accordance with an embodiment.

One embodiment of the synchronization FIFOs 250/252 of FIG. 2 is shown in FIG. 3A. As shown a synchronization FIFO may include a clock divider, phase detector and data storage flop structure. Such a design would provide full streaming of data through the synchronization FIFO without any throttle restrictions. As shown, the D-flip-flop A and inverter is used to divide the 2x clock and generate select-line (i.e., Data_En) for the multiplexer D. The multiplexer C is used to select the data sampling phase and is controlled by a configuration bit from B. This provides flexibility to sample 1x_Clk_DataA in rising or falling edge of 1x clock to resolve any setup or hold issue. The 1x_clk_DataA data may be sampled in every other 2x_clk and sent through the 2x_clk flop structure E. The flop structure also holds the data for complete 2x_clk by using the re-circulating path to D. Such an embodiment also allows the external logic analyzer to show data in 1x clock domain.

Referring to FIG. 2, multiplexer 255 is coupled to a second multiplexer 260. As shown, in addition to the test data provided to multiplexer 260, outgoing data from common block 222 is also provided to multiplexer 260. Both multiplexers may be controlled by a test controller unit 240, which provides a select signal to each of the multiplexers, namely a Ping_Pong_Sel signal to multiplexer 255 and a Test_Mode_Sel signal to multiplexer 260. In an embodiment, AFE 224 is clocked according to a clock received from common block 222.

Test controller 240 may include a register set that may be accessed externally, e.g., via a test access port (TAP) controller. Test controller 240 may further include hardware, software, and/or firmware to provide controllability to monitor various operational modes of and/or communication between the SOC components. For example, control may be enabled to monitor just the transmit side or the receive side. Thus, test controller 240 may provide for flexibility to enable different test modes. In some embodiments, test controller 240 may operate under limited control from an external source such as a logic analyzer (e.g., logic analyzer 105), while in other embodiments greater control, e.g., via control of the internal register set, may be accommodated under limited control of an external source. As one example, a ping-pong pattern may be controlled such that a data pattern provided out of the SOC 200 includes interleaved transmit and receive data.

Still referring to FIG. 2, component 202 may include its own dedicated logic (not shown but such as discussed with reference to component 204) which in one embodiment may be interface circuitry, controller circuitry, memory control circuitry, one or more processor cores or so forth. In addition, a protocol stack or interface may also be present, including a transaction layer 280 and a common block 285 (but there is no need for any AFE), which may also operate at the 1x clock domain. While shown with this particular embodiment of FIG. 2, the scope of the embodiments is not limited in this regard.

Also, although test controller 240 and component 202 are shown to be within 1x clock domain, this items may or may not be in 1x clock domain in various embodiments. Further, in one embodiment, logic 124 of FIG. 1 may include one or more of: test controller 240, FIFO 250/252, multiplexors 255/260, layer 220, block 222, AFE 224, Port A, and/or interface 208.

Figure 3B:
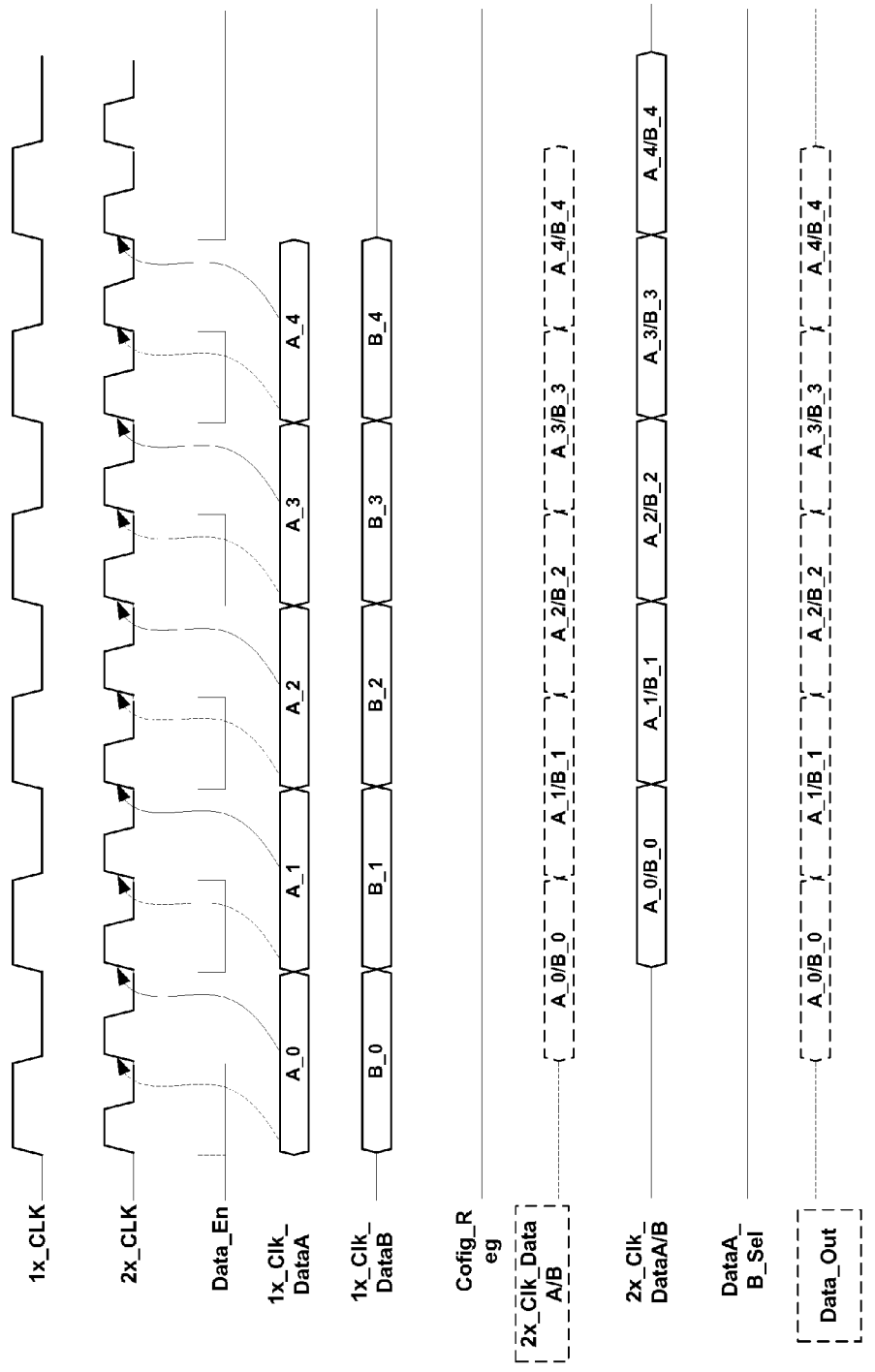
FIG. 3B shows a timing diagram illustrating operation in a test mode in accordance with one embodiment.

Referring now to FIG. 3B, shown is a timing diagram illustrating operation in a test mode in accordance with one embodiment. In an embodiment, the signals shown refer to signals discussed herein with reference to FIGS. 1-3A. As shown in FIG. 3B, two different clock domains are present, e.g., such as discussed above. The clock signals for the two domains are shown in the first two rows of FIG. 3B; namely 1x_Clk and 2x_Clk signals. In one embodiment, component 202 may operate at the 1x clock rate and component 204 may operate at the 2x clock rate, although the logic of these die may operate according to clocks independent of the 1x and 2x clock signals. Due to the different clock domains, at least a portion of component 204 (e.g., the internal interface and the write control for buffers 250/252) may be controlled to operate at a first clock rate, using a clock recovered from incoming data from component 202, as further described below.

For example, to enable the communication of both incoming and outgoing data during test mode (i.e., Data A and Data B), the Ping_Pong_Sel signal may be provided from test controller 240 to multiplexer 255. In this way, the output data from first multiplexer 255 (Data_Out) may be provided via link 208 to, e.g., a test logic analyzer 105. During this test mode, the Test_Mode_Sel signal (not shown in FIG. 3A) may enable multiplexer 260 to provide the test data output from first multiplexer 255 to AFE 224. However, during normal operation the opposite control of multiplexer 260 is provided such that the data from common block 222 is provided to AFE 224.

Thus as illustrated in FIGS. 2 and 3B, for the case when symbols are being transmitted from component 204 Tx side to component 202 Rx side, the transmitted symbols are collected by tapping off symbols from the interface between common block 232 (i.e., Data A). The Data A (at the 1x clock rate) is pushed through the multiplexers 255 and 260 to AFE 224 Tx side.

For the case when symbols are being transmitted from component 202 Tx side to component 204 Rx side, the transmitted symbols are collected by tapping off symbols from the interface to common block 232. The Data B (at the 1x clock rate) is pushed through buffer 250 and the multiplexers 255 and 260 to AFE 224 Tx side.

In some embodiments, test controller 240 controls both multiplexer selects (Ping_Pong_Sel and Test_Mode_Sel). The "Ping_Pong_Sel" may be controlled to operate in ping-pong fashion between Data A and Data B or to select either Data A or B. The "Test_Mode_Sel" selects either regular symbol transmission from common block 222 and AFE 224 or the "Data_Out" data (i.e., internal PCIe™ data). When "Test_Mode_Sel" is asserted, "Data_Out" will be transmitted through the AFE 224 Tx side.

Accordingly, visibility of the internal PCIe™ interface may be achieved without the need for use of additional pins, ports or other external interfaces over an existing interface. At least some embodiments avoid the need for dedicated ports or top-side custom probing solutions on the package to observe the internal serial bus-based interface. While shown with this particular implementation in the embodiment of FIGS. 2 and 3B, the scope of the embodiments are not limited in this regard. For example, in other embodiments, a SOC may include more than two components, with communications along internal links between them all transmitted from the SOC over a single external link.

Figure 4:
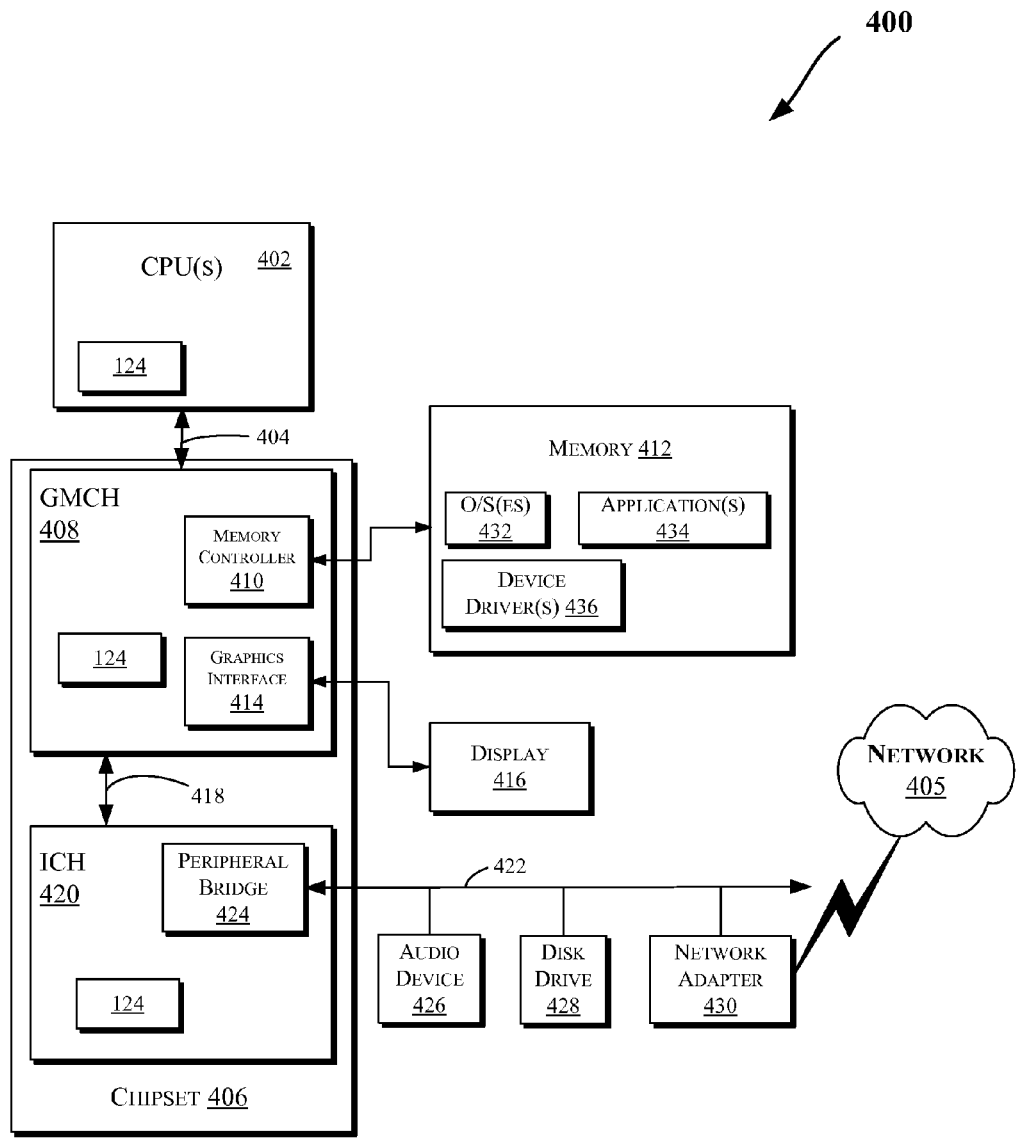

FIG. 4 illustrates a block diagram of an embodiment of a computing system 400. One or more of the agents 102 of FIG. 1 may comprise one or more components of the computing system 400. Also, one or more components of FIG. 4 may include logic 124 of FIG. 1. Also, logic 124 may be present in components other than those shown. The computing system 400 may include one or more central processing unit(s) (CPUs) 402 (which may be collectively referred to herein as "processors 402" or more generically "processor 402") coupled to an interconnection network (or bus) 404. The processors 402 may be any type of processor such as a general purpose processor, a network processor (which may process data communicated over a computer network 405), etc. (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors.

The processor 402 may include one or more caches which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such as a level 1 (L1) cache, a level 2 (L2) cache, a level 3 (L3), a mid-level cache, a last level cache (LLC), etc. to store electronic data (e.g., including instructions) that is utilized by one or more components of the system 400. Additionally, such cache(s) may be located in various locations (e.g., inside other components to the computing systems discussed herein.

A chipset 406 may additionally be coupled to the interconnection network 404. Further, the chipset 406 may include a graphics memory control hub (GMCH) 408. The GMCH 408 may include a memory controller 410 that is coupled to a memory 412. The memory 412 may store data, e.g., including sequences of instructions that are executed by the processor 402, or any other device in communication with components of the computing system 400. In an embodiment, memory 412 may be the same or similar to memory 120 of FIG. 1. Also, in one embodiment of the invention, the memory 412 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 404, such as multiple processors and/or multiple system memories.

The GMCH 408 may further include a graphics interface 414 coupled to a display device 416 (e.g., via a graphics accelerator in an embodiment). In one embodiment, the graphics interface 414 may be coupled to the display device 416 via an accelerated graphics port (AGP). In an embodiment of the invention, the display device 416 (such as a flat panel display) may be coupled to the graphics interface 414 through, for example, a signal converter that translates a digital representation of an image stored in a storage device such as video memory or system memory (e.g., memory 412) into display signals that are interpreted and displayed by the display 416.

As shown in FIG. 4, a hub interface 418 may couple the GMCH 408 to an input/output control hub (ICH) 420. The ICH 420 may provide an interface to input/output (I/O) devices coupled to the computing system 400. The ICH 420 may be coupled to a bus 422 through a peripheral bridge (or controller) 424, such as a peripheral component interconnect (PCI) bridge that may be compliant with the PCIe specification, a universal serial bus (USB) controller, etc. The bridge 424 may provide a data path between the processor 402 and peripheral devices. Other types of topologies may be utilized. Also, multiple buses may be coupled to the ICH 420, e.g., through multiple bridges or controllers. Further, the bus 422 may comprise other types and configurations of bus systems. Moreover, other peripherals coupled to the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 422 may be coupled to an audio device 426, one or more disk drive(s) 428, and a network adapter 430 (which may be a NIC in an embodiment). In one embodiment, the network adapter 430 or other devices coupled to the bus 422 may communicate with the chipset 406. Also, various components (such as the network adapter 430) may be coupled to the GMCH 408 in some embodiments of the invention. In addition, the processor 402 and the GMCH 408 may be combined to form a single chip. In an embodiment, the memory controller 410 may be provided in one or more of the CPUs 402. Further, in an embodiment, GMCH 408 and ICH 420 may be combined into a Peripheral Control Hub (PCH).

Additionally, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 412 may include one or more of the following in an embodiment: an operating system (O/S) 432, application 434, and/or device driver 436. The memory 412 may also include regions dedicated to Memory Mapped I/O (MMIO) operations. Programs and/or data stored in the memory 412 may be swapped into the disk drive 428 as part of memory management operations. The application(s) 434 may execute (e.g., on the processor(s) 402) to communicate one or more packets with one or more computing devices coupled to the network 405. In an embodiment, a packet may be a sequence of one or more symbols and/or values that may be encoded by one or more electrical signals transmitted from at least one sender to at least on receiver (e.g., over a network such as the network 405). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 405).

In an embodiment, the application 434 may utilize the O/S 432 to communicate with various components of the system 400, e.g., through the device driver 436. Hence, the device driver 436 may include network adapter 430 specific commands to provide a communication interface between the O/S 432 and the network adapter 430, or other I/O devices coupled to the system 400, e.g., via the chipset 406.

In an embodiment, the O/S 432 may include a network protocol stack. A protocol stack generally refers to a set of procedures or programs that may be executed to process packets sent over a network 405, where the packets may conform to a specified protocol. For example, TCP/IP (Transport Control Protocol/Internet Protocol) packets may be processed using a TCP/IP stack. The device driver 436 may indicate the buffers in the memory 412 that are to be processed, e.g., via the protocol stack.

The network 405 may include any type of computer network. The network adapter 430 may further include a direct memory access (DMA) engine, which writes packets to buffers (e.g., stored in the memory 412) assigned to available descriptors (e.g., stored in the memory 412) to transmit and/or receive data over the network 405. Additionally, the network adapter 430 may include a network adapter controller, which may include logic (such as one or more programmable processors) to perform adapter related operations. In an embodiment, the adapter controller may be a MAC (media access control) component. The network adapter 430 may further include a memory, such as any type of volatile/nonvolatile memory (e.g., including one or more cache(s) and/or other memory types discussed with reference to memory 412).

Figure 5:
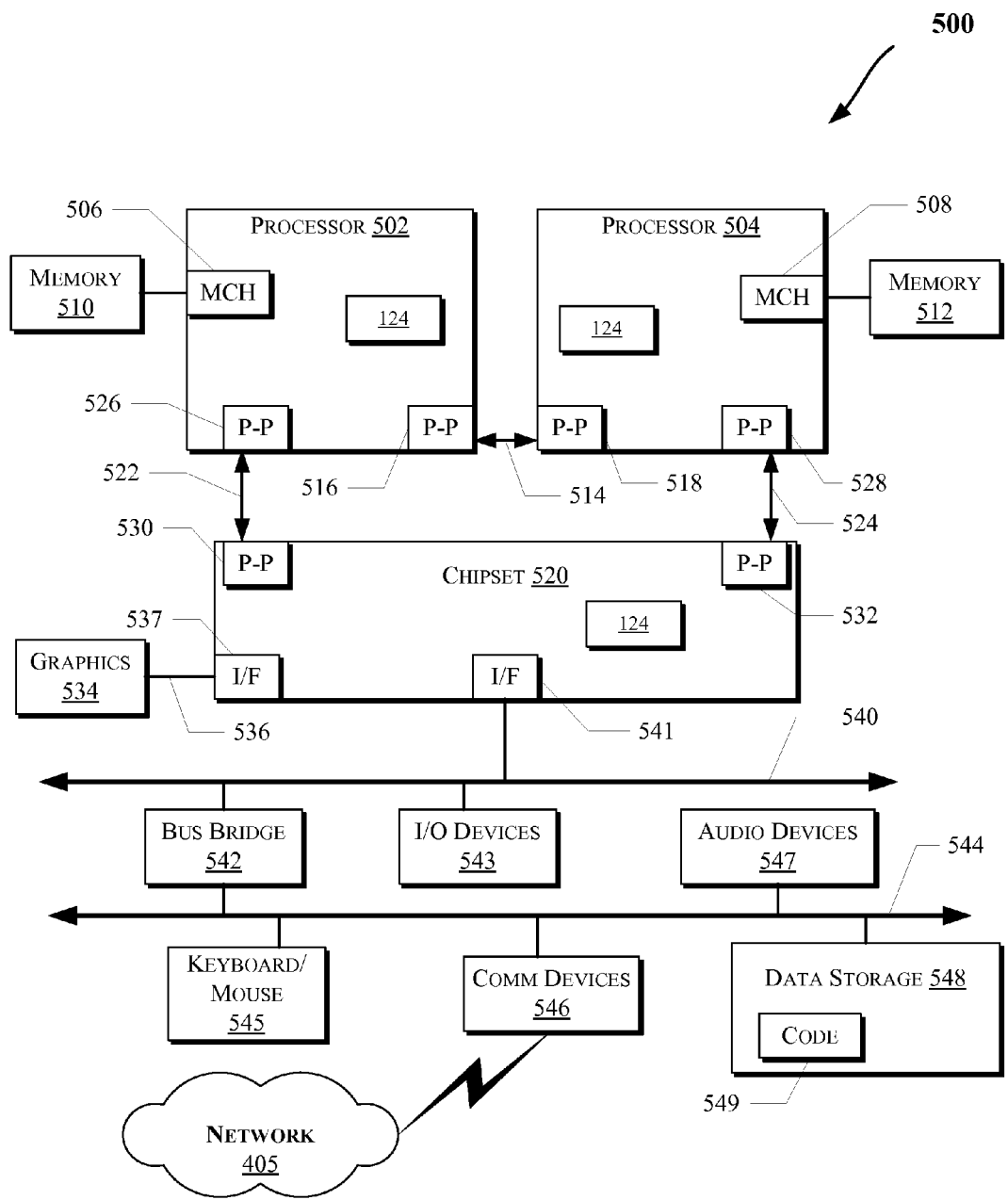

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces.

The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (GMCH) 506 and 508 to enable communication with memories 510 and 512. The memories 510 and/or 512 may store various data such as those discussed with reference to the memory 512 of FIG. 5. As shown in FIG. 5, the processors 502 and 504 (or other components of system 500 such as chipset 520, I/O devices 543, etc.) may also include one or more cache(s) such as those discussed with reference to FIGS. 1-4.

In an embodiment, the processors 502 and 504 may be one of the processors 502 discussed with reference to FIG. 5. The processors 502 and 504 may exchange data via a point-to-point (PtP) interface 514 using PtP interface circuits 516 and 518, respectively. Also, the processors 502 and 504 may each exchange data with a chipset 520 via individual PtP interfaces 522 and 524 using point-to-point interface circuits 526, 528, 530, and 532. The chipset 520 may further exchange data with a high-performance graphics circuit 534 via a high-performance graphics interface 536, e.g., using a PtP interface circuit 537.

In at least one embodiment, logic 124 may be provided in one or more of the processors 502, 504 and/or chipset 520. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5. However, logic 124 may be provided in locations throughout the system 500, including or excluding those illustrated.

The chipset 520 may communicate with the bus 540 using a PtP interface circuit 541. The bus 540 may have one or more devices that communicate with it, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 505), audio I/O device, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) through data signals provided via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A System On Chip (SOC) device comprising:
a first component coupled to a second component via an internal link, wherein the first and second components are to communicate via the internal link without use of any analog front ends; and
logic to enable communication between the SOC device and an external link coupled to the SOC device, wherein the logic is to comprise a test controller to cause monitoring of operations of one or more components of the SOC device or cause monitoring of communications between the one or more components of the SOC device in response to a command, wherein the test controller is to cause selection of input signals of a first multiplexer and a second multiplexer, the first multiplexer having a first input coupled to a transmit portion of the internal link and a second input coupled to a receive portion of the internal link, the second multiplexer having a first input coupled to an output of the first multiplexer and a second input coupled to the external link.

2. The SOC device of claim 1, wherein the command is to be transmitted by a device external to the SOC device.

3. The SOC device of claim 1, wherein the command is to be transmitted by a logic analyzer that is external to the SOC device.

4. The SOC device of claim 1, wherein the command is to be transmitted via a non-dedicated interface of the SOC device.

5. The SOC device of claim 1, wherein the logic is to comprise a plurality of synchronization buffers to transfer data between a first clock domain and a second clock domain.

6. The SOC device of claim 1, wherein the logic is to comprise the first and second multiplexers whose inputs are to be selected based on a plurality of signals to be generated by the test controller.

7. The SOC device of claim 1, wherein the logic is to comprise a transaction layer.

8. The SOC device of claim 1, wherein the logic is to comprise a common block.

9. The SOC device of claim 1, wherein the logic is to comprise an analog front end.

10. The SOC device of claim 1, wherein at least one of the first component or the second component are to comprise a processor having one or more processor cores.

11. The SOC device of claim 1, further comprising a processor having one or more processor cores, wherein the processor is to comprise the logic.

12. A method comprising:
  establishing communication between a first component and a second component via an internal link and without use of any analog front ends; and
  enabling communication between a SOC device, which comprises the first and second component, and an external link coupled to the SOC device; and
  causing monitoring of operations of one or more components of the SOC device or causing monitoring of communications between the one or more components of the SOC device in response to a command, wherein the test controller causes selection of input signals of a first multiplexer and a second multiplexer, the first multiplexer having a first input coupled to a transmit portion of the internal link and a second input coupled to a receive portion of the internal link, the second multiplexer having a first input coupled to an output of the first multiplexer and a second input coupled to the external link.

13. The method of claim 12, further comprising transmitted the command from a device external to the SOC device.

14. The method of claim 12, further comprising transmitting the command from a logic analyzer that is external to the SOC device.

15. The method of claim 12, further comprising transmitting the command via a non-dedicated interface of the SOC device.

16. A system comprising:
  a plurality of synchronization buffers to transfer data between a first clock domain and a second clock domain;
  a first component;
  a second component coupled to the first component via an internal link, wherein the first and second components are to communicate via the internal link without use of any analog front ends; and
  logic to enable communication between the SOC device and an external link coupled to the SOC device, wherein the logic is to comprise a test controller to cause monitoring of operations of one or more components of the SOC device or cause monitoring of communications between the one or more components of the SOC device in response to a command, wherein the test controller is to cause selection of input signals of a first multiplexer and a second multiplexer, the first multiplexer having a first input coupled to a transmit portion of the internal link and a second input coupled to a receive portion of the internal link, the second multiplexer having a first input coupled to an output of the first multiplexer and a second input coupled to the external link.

17. The system of claim 16, wherein the command is to be transmitted by a device external to the SOC device or by a logic analyzer that is external to the SOC device.

18. The system of claim 16, wherein the command is to be transmitted via a non-dedicated interface of the SOC device.

19. The system of claim 16, wherein the logic is to comprise the plurality of synchronization buffers.

20. The system of claim 16, wherein the logic is to comprise the first and second multiplexers whose inputs are to be selected based on a plurality of signals to be generated by the test controller.

* * * * *